(12) United States Patent
Jardine et al.

(10) Patent No.: US 6,800,129 B2
(45) Date of Patent: Oct. 5, 2004

(54) HIGH SOLIDS PUMPABLE CEMENT ADDITIVES

(75) Inventors: Leslie A. Jardine, Salem, MA (US); David F. Myers, Acton, MA (US); Anandakumar Ranganathan, Waltham, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 9 days.

(21) Appl. No.: 10/354,809

(22) Filed: Jan. 30, 2003

(65) Prior Publication Data

US 2004/0149172 A1 Aug. 5, 2004

(51) Int. Cl.[7] .......... C04B 24/00; C04B 24/12; C04B 24/02; C04B 24/24; C04B 40/00
(52) U.S. Cl. .......... 106/724; 106/729; 106/730; 106/802; 106/804; 106/815; 106/819; 106/823
(58) Field of Search .......... 106/724, 729, 106/730, 802, 804, 815, 819, 823

(56) References Cited

U.S. PATENT DOCUMENTS

| | | | |
|---|---|---|---|
| 4,402,851 A | 9/1983 | Lindahl | 252/181 |
| 4,547,223 A | 10/1985 | Goto et al. | 106/90 |
| 5,004,506 A | 4/1991 | Allen et al. | 106/729 |
| 5,175,278 A | 12/1992 | Peik et al. | 536/123 |
| 5,180,430 A | 1/1993 | Gartner et al. | 106/730 |
| 5,393,343 A | 2/1995 | Darwin et al. | 106/808 |
| 5,556,460 A | 9/1996 | Berke et al. | 106/823 |
| 5,618,344 A | 4/1997 | Kerkar et al. | 106/823 |
| 5,622,558 A | 4/1997 | Berke et al. | 106/802 |
| 5,779,788 A | 7/1998 | Berke et al. | 106/802 |
| 5,840,114 A | 11/1998 | Jeknavorian et al. | 106/802 |
| 6,068,697 A | 5/2000 | Yamamuro et al. | 106/804 |
| 6,106,603 A | 8/2000 | Skaggs et al. | 106/205 |
| 6,110,271 A | 8/2000 | Skaggs et al. | 106/804 |
| 6,117,226 A | 9/2000 | Dial et al. | 106/162.8 |
| 6,139,623 A | 10/2000 | Darwin et al. | 106/823 |
| 6,166,119 A | 12/2000 | Matsuo et al. | 524/376 |
| 6,221,152 B1 | 4/2001 | Dial et al. | 106/805 |
| 6,309,455 B1 | 10/2001 | Skaggs et al. | 106/205 |
| 6,352,952 B1 | 3/2002 | Jardine et al. | 501/141 |
| 6,358,310 B1 | 3/2002 | Berke et al. | 106/802 |
| 6,441,054 B1 | 8/2002 | Ou et al. | 516/11 |

FOREIGN PATENT DOCUMENTS

| | | | |
|---|---|---|---|
| GB | 2378946 A | 8/2001 | C04B/24/00 |
| WO | WO 99/44966 | 10/1999 | C04B/40/06 |

*Primary Examiner*—Elizabeth D. Wood
(74) *Attorney, Agent, or Firm*—Craig K. Leon; William L. Baker

(57) ABSTRACT

Exemplary liquid cement additive compositions have high solids loading which includes alkali or alkaline earth metal salts and other cement additive components. The liquid carrier is preferably aqueous in nature, although non-aqueous carriers are possible, and the carrier is modified using a viscosity modifying agent and dispersant to help load salt and other solids in high level amounts. Thus, methods for making the liquid cement additive compositions are also disclosed.

31 Claims, 2 Drawing Sheets

HIGH SOLIDS PUMPABLE CEMENT ADDITIVES

FIELD OF THE INVENTION

The present invention relates to enhancing processing of cement from clinker, and more particularly to a liquid-dispensable, high solids-loaded cement additive composition comprising at least one salt and optionally an amine, glycol, and/or carbohydrate, and to processes for making the same.

BACKGROUND OF THE INVENTION

Cement additives are known for enhancing the processing of cement from the grinding of clinker, gypsum, and fillers such as limestone, granulated blast furnace slag, and other pozzolans.

Cement additives comprising salts are also known. Such additives typically comprise a calcium chloride salt or sodium chloride salt, and optionally an amine and/or a carbohydrate. Such additives, usually in the form of aqueous solutions, are intended to enhance properties of cement such as strength and set time. The maximum amount of active solids in these aqueous solutions is limited by the solubility of the least water-soluble component, which is usually the chloride salt, in the water component. Salt-containing additives, which are commercially available from Grace Construction Products, Cambridge, Massachusetts, under the tradename TDA®, typically have total solids contents of 30–40% dry weight solids.

If the concentration of a given salt exceeds its solubility limit, then the salt will precipitate out of the aqueous solution and render the cement additive product difficult to use and dispense in the cement grinding operation. This is because the precipitation will clog the dispensing system and form solid masses in storage tanks. The cement additive then becomes a mixed-phase material, because one or more of its components, due to precipitation, will no longer be in solution while other components may remain in solution. The result is that the proportions of the components within the cement additive product will likely be less than ideal for the intended application, since the precipitated components will not be pumped or dispensed into the cement clinker grinding operation as intended.

Thus, one of the problems with using high concentration salt solutions is the risk that precipitation can occur. Any number of factors, such as a decrease in temperature, evaporation of water, or nucleating events such as contamination, can prompt a highly salt-saturated solution to precipitate. The precipitation will cause pump-dispensing problems and/or dosage miscalculations and inefficiencies. The typical dosage for these liquid products is 1500–2500 grams of cement additive product per ton of cement, clinker, and fillers. Hence, if the cement manufacturing plant (mill) were to use a cement additive product to produce 70 tons of cement per hour, then approximately one truckload (about 45,000 pounds) of the liquid cement additive product would be required on a weekly basis. Given the influence of the cement additive on the strength or set time performance characteristics of the cement, a missed shipment could mean that there will be a significant decrease in the quality of the cement being produced.

The shipment, storage, and handling of large volumes of liquid additive materials is highly inconvenient. However, the use of dry powders is not a more convenient or desirable alternative, because dry powders are difficult to dispense accurately -and they present a health concern due to the dust arising from the dry powder.

Accordingly, the present inventors believe that the use of a highly concentrated liquid additive provides great value and resolves problems discussed above. Until the present invention, however, it has not been possible to use and dose an extremely highly concentrated liquid salt-containing cement additive. Such a highly concentrated salt liquid, moreover, needs to be stable in suspension for long periods of time, resistant to temperature changes, and capable of being pumped so that it can be dispensed into the clinker cement grinding operation.

SUMMARY OF THE INVENTION

In surmounting the disadvantages of the prior art, the present invention provides a novel high-solids liquid cement additive compositions and method for making them. Exemplary liquid cement additive compositions of the invention comprise at least one salt, a liquid carrier, and a viscosity-modifying agent (VMA) that increases the amount of total active solids that can be suspended in the liquid carrier. If the liquid carrier is water, then exemplary embodiments of the invention further comprise a VMA-dispersing agent that not only disperses the VMA within the aqueous environment, but enhances the capacity of the liquid cement additive composition to load the salt and other cement additives at levels higher than would be possible by mere solubilization of the salt and other additives.

In particular, aqueous liquid carriers are used to dissolve a first portion of a particular cement additive (e.g., salt) while a second portion of the cement additive is suspended in the form of non-dissolved solid particles, through the use of the VMA and VMA-dispersant.

Thus, an exemplary liquid cement additive composition of the invention comprises: a liquid carrier for suspending a first cement additive, such as an alkali or alkaline earth metal salt, in the form of solid particles substantially uniformly throughout the liquid carrier. The salt may comprise a chloride, nitrate, nitrite, thiocyanate, borate, polyphosphonate, gluconate, or mixture thereof. Preferably, a second cement additive, which is different from the first cement additive, is contained within the liquid carrier as a solute and/or as non-dissolved solid particles. For example, the second cement additive may comprise an amine, an alkanolamine, a poly(hydroxyalkylated) polyethyleneamine, a glycol, a carbohydrate, a surfactant, or mixture thereof.

Exemplary liquid cement additive compositions have a total salt content of 50–90% by wt. based on total weight of said liquid cement additive composition, and a total solids content of 70%–100% by wt. based on total weight of said composition.

If the liquid carrier is an aqueous suspension, then it will be possible that a first portion of the alkali or alkaline earth metal salt is contained as a solute, while a second portion is in the form of non-dissolved solid particles, such that the liquid cement additive composition can contain solids in amounts that exceed the water-solubility factor for individual solids.

In preferred embodiments, a viscosity modifying agent (VMA), preferably with a dispersing agent operative to enhance the ability of the liquid carrier to suspend the solids (e.g., salt) particles, is used. In a preferred exemplary method, a VMA, such as biopolymer S-657, is mixed first with a polycarboxylate polymer, which is preferably a comb polymer having pendant oxyalkylene groups, and water, thereby forming a first suspension; and this first suspension is mixed with at least one alkali or alkaline earth metal salt to obtain a second suspension, which then may be used as a liquid cement additive composition which can be dispensed into the grinding operation whereby clinker is ground to provide cement.

As an alternative to the foregoing method wherein an aqueous suspension is employed, other exemplary methods of the invention involve a non-aqueous liquid carrier for dispersing the VMA. For example, a nonaqueous liquid carrier medium can include an amine, an alkanolamine, a poly(hydroxyalkylated) polyethyleneamine, a glycol, a surfactant, or mixture thereof is combined with the VMA to provide a first (nonaqueous) suspension; and then this first suspension is mixed with water to allow the VMA to hydrolyze and increase in viscosity prior to adding the at least one alkali or alkaline earth metal salt to obtain a second (aqueous) suspension. Exemplary compositions of the invention made by this method therefore comprise the nonaqueous liquid carrier, a VMA, and at least one alkali or alkaline earth metal salt, wherein the VMA and salt are present in the amount ranges summarized above.

As a further alternative, the VMA can first be dispersed in a dry blend with an alkali or alkaline earth metal salt, which is then added to a premixed combination of water and an amine, an alkanolamine, a poly(hydroxalkylated) polyethyleneamine, a glycol, a carbohydrate, a surfactant, or a mixture thereof. As the VMA hydrolyzes with mixing, the suspension will build sufficient viscosity to keep the undissolved salts in suspension.

All of the previous methods describe a system wherein the VMA is dispersed within a liquid carrier (typically of greater volume, e.g., three times) to protect the VMA from clumping when the VMA finally comes into contact with a solvent (water in the foregoing cases). This allows for most dosage-efficient use of the VMA, which is an expensive component of the final dispersion. In a further alternative method, the VMA can be effectively dispersed in water directly by using a high sheer mixer while adding the VMA to water, thus minimizing or avoiding clumping. The high sheer mixer is preferably of the continuous type, such that water and VMA are metered into a mixing chamber where a mixing element or rotor is spinning between 1000–5000 rpm, whereby the VMA is dispersed into the water. Once the VMA and water is high-shear-mixed to provide a high viscosity first suspension, then the at least one alkali or alkaline earth metal salt can be combined, using conventional mixers at slower speeds, to obtain a second (aqueous) suspension.

Thus, exemplary compositions and methods of the invention allow one or more salts to be loaded into an aqueous suspension well beyond their solubility limit, while at the same time allowing the resultant liquid cement additive-composition to be pumped as a liquid and to maintain stability across a wide range of temperatures during storage and shipment.

Due to the ability of the invention to provide high-solids additives loading, exemplary liquid cement additive compositions of the invention afford additional advantages in terms of decreased freight costs and lower frequency of deliveries. A further benefit is its ability to incorporate a wide range of components, particularly ones having low (or even no) solubility in water.

Thus, a further exemplary method of the invention for making a cement additive composition, comprises: obtaining a first liquid suspension (preferably aqueous) by combining a viscosity modifying agent, a dispersing agent operative to disperse the viscosity modifying agent (preferably in water), and a liquid carrier medium (preferably water); and obtaining a second liquid aqueous suspension by combining the first liquid aqueous suspension with at least one alkali or alkaline earth metal salt, whereby water is present in an amount of 0.1%–30% by total weight of said composition.

In preferred methods, the viscosity modifying agent (VMA) is "premixed" first with the dispersing agent before the liquid carrier medium (e.g., water) is added to the first liquid aqueous suspension in order to separate and disperse the VMA and to ensure that a stable dispersion is obtained.

A preferred viscosity modifying agent (VMA) is polysaccharide S-657, which optionally may be supplemented with other VMAs (e.g., welan gum). A preferred dispersant is a polycarboxylate polymer, and more preferably a comb polymer having pendant polyoxyalkylene groups. Other exemplary dispersants include alcohols (e.g., ethanol, methanol, isopropanol), polyethylene oxide, polycarboxylic acid (which also shall be used to refer to the salt or derivatives thereof in this case), polyacrylamide; or a mixtures thereof. Amines, glycols, and combinations of these may be used as dispersing agents for S-657 in some embodiments of the invention. For some dispersing agents, such as an amine, it is preferred to use as little of the amine as possible to achieve the dispersing effect. For others, such as polycarboxylate polymer dispersants, one may need to consider keeping the amount close to the minimum level required for dispersing the VMA lest the function of any cement additives contained in the composition be diminished.

In further exemplary embodiments, at least one other cement additive can optionally be included in the cement additive composition, preferably after the first liquid aqueous suspension is obtained (i.e., after first stage) and before the alkali or alkaline earth metal salt or salts are combined to obtain the second liquid aqueous suspension. Further exemplary cement additives include a carbohydrate (e.g., sugar, sugar derivative), an amine (e.g., triethanolamine, triisopropanolamine), a glycol (e.g., ethylene glycol, diethylene glycol, propylene glycol, polyethylene glycol, etc.), a surfactant, or a mixture thereof. The amount of active solids in the second liquid aqueous suspension is preferably about 60% to 96% by total weight of composition.

The present invention thus also relates to a high solids liquid cement additive composition made by any of the foregoing methods. It also relates to cementitious compositions and methods for making such cementitious compositions whereby one of the above-described cement additive compositions is introduced to clinker or gypsum before or during the grinding operation to produce Portland cement. Preferred cement additive compositions are suspensions wherein water is present in an amount of 0.01–30% by weight of the total composition, wherein the use of the viscosity modifying agent (0.01–3.0% wt) and dispersant (0.02–4.0% wt) permit one or more alkali or alkaline earth metal salts to be present as a solute in the aqueous phase, as well as a suspended (non-dissolved) solid dispersed within the liquid medium. Additional additives, such as an amine, alkanolamine, glycol, carbohydrate, and/or surface active agent, may also contained within the liquid cement additive composition, such as by being dissolved within an aqueous phase and/or suspended in non-dissolved solid form within the liquid carrier medium (which could be water or non-aqueous) as may be applicable to the particular additive material selected.

Further features and advantages of the invention are discussed in further detail hereinafter.

DETAILED DESCRIPTION OF EXEMPLARY EMBODIMENTS

Figure 1:
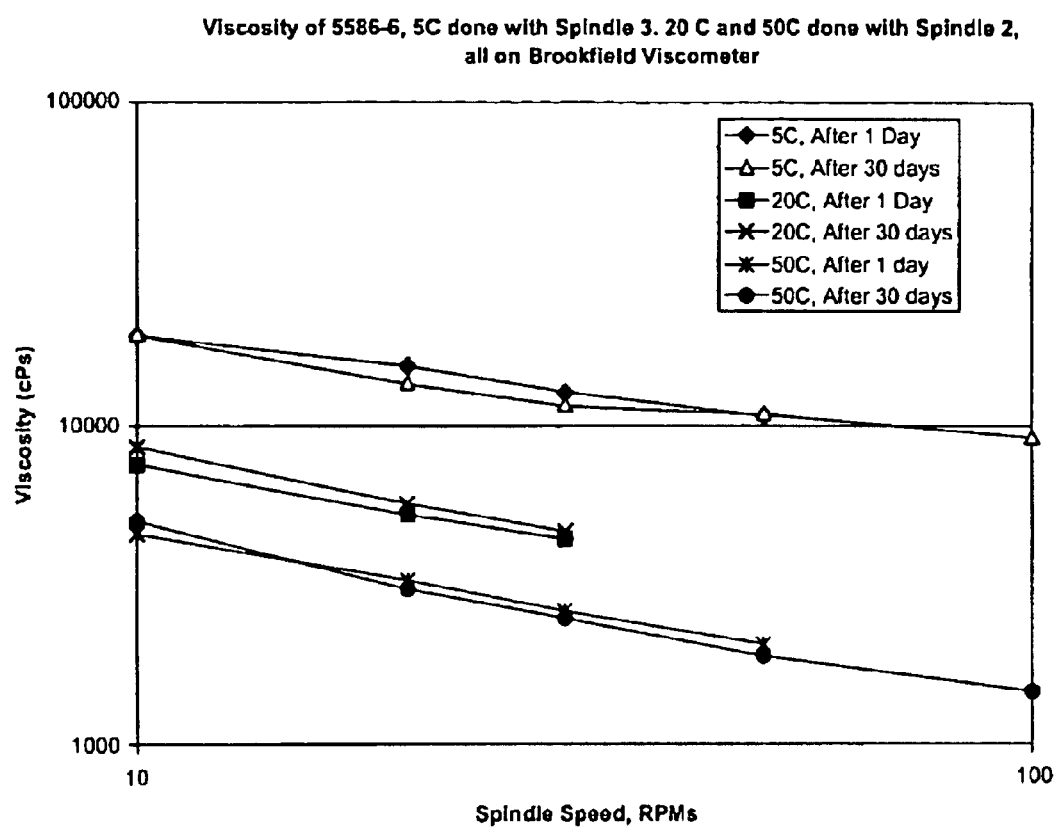
FIG. 1 is a graphic illustration of the viscosity of an exemplary liquid cement additive composition of the invention, described in Example 1, at three different temperatures.
Figure 2:
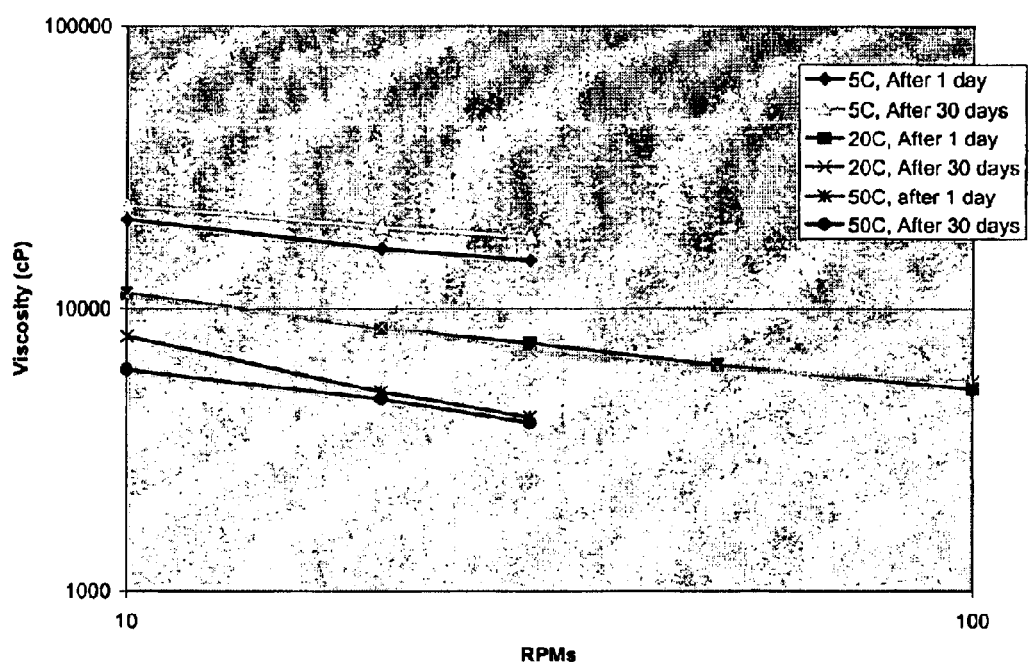
FIG. 2 is a graphic illustration of the viscosity of another liquid cement additive composition of the invention, as discussed in Example 2, at three different temperatures.

The present invention provides novel storage-stable, pumpable liquid cement additive compositions and methods for making them. As summarized above, one exemplary method involves the use of an aqueous liquid carrier, wherein a viscosity modifying agent is first dispersed into water using a dispersant, and non-salt cement additives are combined, to form a first suspension; and then one or more alkali or alkaline earth metal salts are added, to obtain a second suspension. Another exemplary method involves the use of non-aqueous liquid carriers to suspend the salt component(s).

One of the exemplary methods of the invention for making a liquid cement additive composition involves two stages, wherein: (1) a viscosity modifying agent (VMA) and at least one dispersant for the VMA are combined with water to provide a first liquid aqueous suspension; and (2) the first liquid aqueous suspension is combined with at least one salt, such as an alkali or alkaline earth metal salt, in an amount that exceeds the water solubility limit of the salt. Preferably, the VMA and dispersant are combined first, with the water being added slowly using thorough stirring, to ensure that the VMA is separated and uniformly dispersed within the aqueous suspension. Optionally, one or more further cement additives can be combined with the first aqueous suspension at the end of stage. The amount of active solids in the dispersion after stage "(2)" should preferably be about 60% to 96% by total weight of the resultant composition.

It is envisioned that the resultant aqueous dispersion will contain a high level of at least one of the components, usually an alkali or alkaline earth metal salt, whereby this salt will be partially non-dissolved yet dispersed (not precipitated) within the aqueous medium and thus deemed to be suspended. The total amount of this particular salt which is contained within the aqueous medium in non-precipitated form will thus be expected by the present inventors to far exceed the amount of this salt that could otherwise be dissolved within the water portion of the aqueous medium. In other words, the resultant liquid cement additive compositions of the invention will contain suspended non-dissolved portions (solid particles) of the salt in addition to dissolved portions of the salt. As an illustration, the total amount of solids dispersed in the aqueous suspension as a whole can be (60–96%) by weight of composition, and this far exceeds the solubility ceilings of the individual components that would otherwise be in the 5–40% range. Thus, the invention allows for more efficient handling of liquid cement additive compositions due to higher solids loading, and these compositions can be considered to be two phase systems wherein finely divided solid phase is dispersed in a liquid phase.

The viscosity modifying agent (VMA) confers storage-stability to aqueous suspension compositions of the invention. Without the presence of the VMA, salts would tend to separate upon standing. Preferably, the VMA should be shear thinning to improve pumpability of the overall cement additive compositions of the invention, especially when the salt or salts are used in high concentration (i.e., above 30% by weight solids). Exemplary liquid cement additive compositions of the invention containing the VMA preferably have a shear thinning characteristic expressed in terms of viscosity ratio (Brookfield viscometer, Spindle #3, 25 degrees C.), wherein viscosity measured at 3 rpm, divided by viscosity measured at 30 rpm, is no less than 2 and no greater than 40.

The amount of VMA used in exemplary liquid cement additive compositions of the invention is preferably in an amount of 0.01–3.0%, and more preferably between 0.05–0.5%, based on weight of total solids in the suspension. A preferred VMA is polysaccharide S-657 which is commercially available from CP Kelco, U.S., Inc. of San Diego, Calif. It is a high molecular weight, microbial polysaccharide, anionic in nature, produced by aerobic fermentation. See e.g., U.S. Pat. No. 5,175,278 of Peik et al (describing biopolymer S-657, a microbial carbohydrate); See also U.S. Pat. No. 6,110,271 of Skaggs et al. (describing microbial polysaccharides such as S-657 used to improve rheological properties of a variety of cementitious systems); See also U.S. Pat. No. 5,175,278 of Peik et al.; See also "Evaluation of S-657 Biopolymer as a new viscosity modifying admixture for self-compacting concrete," Sakata et al. Proceedings of the Second International Symposium on Self-Compacting Concrete, pgs. 229–232.

The present inventors also discovered that other viscosity modifying agents (VMAs) may be employed, and these include, but are not limited to: (a) biopolymer polysaccharides selected from the group consisting of welan gum, xanthan, rhamsan, gellan, dextran, pullulan, curdlan, and derivatives thereof; (b) marine gums selected from the group consisting of algin, agar, carrageenan, and derivatives thereof, (c) plant exudates selected from the group consisting of locust bean, gum arabic, gum Karaya, tragacanth, Ghatti, and derivatives thereof; (d) seed gums selected from the group consisting of guar, locust bean, okra, psyllium, mesquite, and derivatives thereof; (e) starch-based gums selected from the group consisting of ethers, esters, and derivatives thereof (See e.g., U.S. Pat. No. 6,1110,271 at Column 3, lines 38–46); and mixtures thereof; (f) associative thickeners selected from the group consisting of hydrophobically modified alkali swellable acrylic copolymer, hydrophobically modified urethane copolymer, associative thickeners based on polyurethanes, cellulose, polyacrylates, or polyethers.

In further preferred embodiments, these other viscosifiers can be used to replace approximately 10–50% of the polysaccharide S-657, thereby reducing costs. Thus, further exemplary liquid cement additive compositions of the invention may comprise S-657 and additionally one or more of the other viscosifiers identified above.

In preferred cement additive compositions and methods of the invention, a viscosity modifying agent (VMA) such as polysaccharide S-657 is dispersed using a dispersant that is preferably water-miscible. Preferably, the dispersant does not function as a solvent with respect to the VMA, i.e., it does not dissolve the VMA but rather operates to suspend the VMA within water. Examples of nonsolvent dispersants include alcohols, such as ethanol, methanol, and isopropanol. The inventors believe that it is possible to use immiscible liquids such as vegetable oils with the VMA in order to disperse the VMA in water, but miscible liquid dispersants are believed to work better.

A preferred nonsolvent dispersant (e.g., does not solubilize the VMA into ions) is a polycarboxylate polymer superplasticizer, preferably one that is a comb polymer having pendant oxyalkylene groups. The VMA and dispersant should be combined with water, prior to combining the VMA and dispersant with any other cement additive components (such as chloride or calcium salts). The term "polycarboxylate superplasticizer" (which may be referred to herein using the acronym "PCS") means and includes polymers or copolymers, and solutions thereof, preferably having a comb structure, which contain groups for attaching to cement particles and groups for dispersing the attached cement particle within an aqueous environment. Preferably, the PCS has a comb polymer structure having (i) carboxylic acid anhydride, free carboxylic acid or its ammonium, alkali or alkaline earth metal salt of carboxylic acid units; and (ii) $C_2$–$C_5$ oxyalkylene units therein and wherein the carboxylic acid units or oxyalkylene units are pendant to the polymer backbone structure and wherein the oxyalkylene units provide a majority of the molecular weight of the comb polymer. The preferred amount of polymer or copolymer to be incorporated in the first suspension in solution is 0.5–10%, and more preferably 1.0–5.0%, by weight solids.

In preferred embodiments of the invention, the first stage wherein the first liquid aqueous suspension is obtained is achieved by combining the polymer (VMA) with the nonsolvent dispersant, preferably in a polymer/nonsolvent ratio of 1:2 to 1:5, and then adding this mixture to water slowly while stirring. The advantage in following these successive steps, in contrast to mixing the polymer directly into the water first, is that the polymer (VMA) particles have sufficient time to separate physically before they start dissolving in the water. Due to the hydrophilic nature of the polymer (VMA) particles, they might tend otherwise to form clumps that are extremely difficult to break up, resulting in a poor solution/dispersion. Hence, it is preferably to combine the polymer VMA with the nonsolvent dispersant first, before adding the water, in obtaining the first liquid aqueous suspension.

Exemplary polycarboxylate superplasticizer type dispersants useful in the invention may have a polymer structure formed from units that can be generally represented by formula I

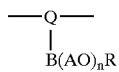

wherein Q is a fragment of the polymer backbone chain such as a hydrocarbon fragment of a residual of an ethylenic group which has a pendant group represented by B(AO)$_n$R; B represents a tying group which covalently bonds the (AO)$_n$R' group to the hydrocarbon polymer backbone chain, the tying group B may be selected from carboxylic acid ester group (—COO—), carboxylic acid amide group (—C(O)NH—), alkenyl ether (—C$_x$H$_2$ O— where x is 1–10), ether oxygen (—O—) or where vicinal pendant 10 groups provide carboxylic acid imide group [(—C(O))$_2$N]; A is a C$_2$–C$_{10}$ alkylene group or mixtures thereof, preferably a C$_2$–C$_4$ alkylene group or mixtures thereof; O represents oxygen atom; R represents a hydrogen atom or a C$_1$–C$_{10}$ hydrocarbon (alkyl, aryl alkaryl or the like) group; and n has a value of from about 25 to 100. Preferably, the oxyalkylene groups (AO) provide a majority of the molecular weight of the polymer.

In addition to the polymer units represented by the formula set forth above, the polymer hydrocarbon backbone chain may contain free carboxylic acid anhydride, the free carboxylic acid or its salt pendant groups.

The polymer may be a homopolymer or a copolymer with other copolymerizable units. The copolymerizable monomeric units may be randomly distributed in the polymer structure or may be alternating with the above structure I. Further, the copolymer may contain either one or more than one type of structure shown by the above formula within the polymer structure, and the units may be random or block configuration. Further, the AO chains of any polymer may be made up of a single oxyalkylene (AO) group, such as oxyethylene, oxypropylene or the like, or mixtures of said groups, and said mixture of AO groups may be in block or random configuration.

The molecular weight of the comb polymers suitable in the present invention for modifying cementitious compositions typically have a weight average molecular weight of from about 2,000 to 200,000, preferably from about 2,000 to 100,000 and most preferably from about 2,000 to 75,000. Preferably, although not necessarily, at least about 50, or even up to 90 percent, by molecular weight of the polymer is attributable to the molecular weight of the AO units therein.

Exemplary polycarboxylate superplasticizers believed suitable for purposes of the present invention are disclosed in the following U.S. Patents: U.S. Pat. No. 4,946,904; U.S. Pat. No. 5,142,036; U.S. Pat. No. 5,362,323; U.S. Pat. No. 5,393,343; U.S. Pat. No. 4,471,100; U.S. Pat. No. 5,369,198; and U.S. Pat. No. 6,139,623, all of which are incorporated fully herein by reference. U.S. Pat. Nos. 4,946,904 and 5,362,323 disclose maleic anhydride/alkenyl ether comb polymers and their hydrolyzed product wherein the oxyalkylene groups are linked to the backbone polymer chain by an alkenyl ether group. U.S. Pat. No. 5,142,036 discloses a maleic anhydride/alkenyl ether copolymer, which further has oxyalkylene groups linked by maleic ester groups. U.S. Pat. No. 5,393,343 discloses polyacrylic acid amide/imide polymers wherein the oxyalkylene chain is linked to the backbone polymer chain by amide groups and vicinal carboxylic acid units which form imide groups. This polymer may further contain unreacted carboxylic acid groups or salts thereof. U.S. Pat. Nos. 4,471,100 and 5,369,198 disclose copolymers which link the oxyalkylene group to the backbone polymer chain by carboxylic acid ester groups.

It will be understood that when an oxyalkylene chain is pendant through a carboxylic acid anhydride (e.g. maleic acid unit) or free carboxylic acid (e.g. acrylic acid unit), not all acid units may be utilized in such linkage and remain as acid units.

Alternately, the comb polymer of the present invention may be a copolymer having a poly(oxyalkylene) backbone wherein carboxylic acid containing units are grafted to the backbone polymer chain. The grafting is normally accomplished by free-radical initiated grafting of ethylenically unsaturated monomers having carboxylic acid groups therein. It is believed (but not intended to limit the scope of the present invention) that the grafting occurs through a secondary carbon atom on the backbone, e.g., one having only one carbon—hydrogen bond. The ethylenically unsaturated carboxylic acid containing monomer, for example, may be acrylic acid, methacrylic acid, itaconic acid and the like as well as their C$_1$–C$_3$ alkyl esters. When the poly (oxyalkylene) polymer has hydroxy termination groups, a small degree of esterification between the hydroxyl and carbonyl group may also be present and additional carboxylic acid units be pendant thereupon. Comb polymers of this type are described in U.S. Pat. No. 4,814,014, incorporated herein by reference.

Polycarboxylate superplasticizer polymers contemplated for use in the present invention preferably comprise at least 50% by weight of (poly)oxyalkylene units forming the major component. Thus, the polymer structure of the superplasticizers may contain other copolymerizable units, provided the above-preferred requirement is met. For example, the copolymer may further have styrene, methyl vinyl ether, vinyl pyrrolidone and the like, as part of the polymer structure.

In general, the present invention involves adding the viscosity modifying agent (VMA), which is preferably a biopolymer polysaccharide, most preferably S-657, to the dispersant polycarboxylate superplasticizer ("PCS"), wherein the weight of VMA to weight of PCS is no less than 1:100 and no greater than 1:1, and more preferably where the ratio is about 1:6, the VMA being uniformly suspended within the dispersant PCS in said first suspension; and forming a second suspension by mixing the first suspension with an aqueous salt solution comprising water and an alkali or alkaline earth metal salt, such as calcium chloride, calcium nitrite, or other salt (as described elsewhere herein), the total salt being present in said solution in a concentration of 20% to 90% dry weight based on total weight of the composition. The resultant aqueous liquid cement additive composition should preferably have a volume 1.5 to 15 times the volume of the first suspension. The first suspension should be fluid and pumpable, such as with a centrifugal or diaphragm pump.

Polycarboxylate superplasticizers that are suitable for use as VMA dispersants in the present invention are available from Grace Construction Products, Cambridge, Mass., under the tradename ADVA®. These polycarboxylate comb polymer solutions may include surface-active agents, and these combinations may have added benefit for the compositions and methods of the invention as described herein.

The inventors believe that surface-active agents, either defoamers or air entraining agents, can enhance the ability of the comb polymer to coat the viscosity modifying agent (e.g., biopolymer) depending on its nature, thereby inhibiting the rate of hydration. Accordingly, in a further exemplary process of the invention, at least one surface-active agent is incorporated into the first and/or second suspensions. If incorporated into the first suspension, then at least one surface active agent may be added before, during, or after the dispersant is combined with the viscosity modifying agent (e.g., S-657 and optional/additional VMAs). Exemplary surface-active agents include compositions having the formula $(PO)(O-R)_3$ wherein R is a $C_2$–$C_{20}$ alkyl group, a phosphate ester, an alkyl ester, a borate ester, a silicone derivative, EO/PO type defoamers, esterified fatty acid esters of a carbohydrate (selected from the group consisting of a sugar, sorbitan, a monosaccharide, a disaccharide, and a polysaccharide), a $C_2$–$C_{20}$ alcohol containing ethylene oxide and propylene oxide ("EO/PO") groups, and mixtures thereof. The surface-active agent are preferably present in the second (or resultant suspension) in the amount of 0–5%, based on dry weight percentage of the total weight of the second suspension.

A preferred surface active agent of the present invention has the formula $(PO)(O-R)_3$ wherein R is a $C_2$–$C_{20}$ alkyl group. More preferably, R is a $C_3$–$C_6$ alkyl group. Most preferred surface-active agents are antifoaming agents. One preferred agent is tri-butyl phosphate (e.g., tri-n-butyl phosphate or tri-i-butyl phosphate), which is a hydrophobic oily liquid at ambient temperature. It is believed that other exemplary surface-active agents suitable for use in the invention include phosphate esters (other than tri-butyl phosphate), alkyl esters (e.g., dibutyl phosphate), borate esters, and silicone derivatives (e.g., polyalkyl siloxanes).

Another preferred surface active agent of the present invention comprises an esterified fatty acid ester of a carbohydrate, such as a sugar, sorbitan, a monosaccharide, a disaccharide, or polysaccharide. An example is sorbitan monooleate. Another preferred surface-active agent useful in the invention comprises an alcohol having a chain length of $C_2$–$C_{20}$, and more preferably $C_{16}$–$C_{18}$, with an EO/PO ratio of less than 1. Suitable surface-active agents of this ethoxylated/propylated alcohol type are available from Huntsman under the tradename SURFONIC® (e.g. SURFONIC® LF 27 and SURFONIC® LF 68) or from BASF under the tradename of PLURONIC® (e.g. PLURONIC® 25-R2).

The exemplary salt component which could be loaded at high solids levels in the invention include one or more alkali or alkaline earth metal salts selected from the group consisting of chlorides, nitrates, nitrites, thiocyanates, borates, polyphosphates, and gluconates. The amount of the salt or salts can be 20–90% by total weight based on the total weight of the cement additive composition.

Further exemplary cement additive compositions of the invention may also optionally include cement additives such as an amine, an alkanolamine (e.g., triethanolamine, triisopropanolamine, diethanolisopropanolamine, etc.), a poly(hydroxyalkylated) polyethyleneamine; a glycol (e.g., ethylene glycol, diethylene glycol, polyethylene glycol); a carbohydrate (e.g., corn syrup, molasses); a surfactant; or mixtures thereof. These additional optional cement additive components can be used in amounts from 0.5–40% or more by total weight of the cement additive composition.

Other additives that may be included in exemplary cement additive compositions of the invention include, but are not limited to, biocidal agents for inhibiting growth of bacterial, fungi, mold, and other life forms. The term "biocidal agent" as used herein thus includes fungicidal, germicidal, and insecticidal agents. Preferred biocidal agents include 4-chloro-3 methyl phenol (and other polyhalogenated phenols); sodium-O-phenylphenate; benzylbromoacetate; 1,2-dibromo 2,4-dicyanobutane; dieldrin emulsions; copper compounds; or mixture thereof Another preferred biocidal agents include phenol phenolate and 2-methyl-4-isothiazolin-3-one.

Another exemplary method involves combining the VMA with a non-aqueous liquid carrier medium, such as an amine, an alkanolamine, a poly(hydroxyalkylated) polyethylencamine, a glycol, a surfactant, or mixture thereof, to provide a first nonaqueous suspension; and this first suspension is then combined with water to allow the VMA to hydrolyze and increase in viscosity prior to adding the at least one alkali or alkaline earth metal salt to obtain a second (aqueous) suspension. Exemplary compositions of the invention made by this method therefore comprise the nonaqueous liquid carrier (e.g., triethanolamine, triisopropanolamine, diethanolisopropanolamine, other alkanolamines), a VMA, and at least one alkali or alkaline earth metal salt, wherein the VMA and salt are present in the amount ranges summarized above. For example, the VMA (0.01%–3.0% by total wt of composition) is added to an amine and/or a glycol (5%–50%), and the mixture is agitated to mix them together. After VMA dispersion is achieved, water (5%–30%) is added. This mixture is stirred until viscosity buildings. To this mixture, one or more salts (50%–90%) are added. (All percentage amounts given are based on total weight of the liquid cement additive composition obtained).

In a further exemplary embodiment, the VMA is dry blended with an alkali or alkaline earth metal salt, then added to a premixed combination of water and an amine, an alkanolamine, a poly(hydroxalkylated) polyethyleneamine, a glycol, a carbohydrate, a surfactant, or a mixture thereof. As the VMA hydrolyzes with mixing, the suspension will build sufficient viscosity to keep the undissolved salts in suspension. For example, the VMA (0.01%–3.0% by total wt of final composition) is combined thoroughly with one or more salts (50–90%). In a separate mixer, water (5%–30%) is combined with up to 50% of other liquid nonaqueous components (e.g., alkanolamine and/or glycol). The solid mixture is added to the liquid mixture, and stirring is continued until viscosity builds.

In a still further exemplary embodiment, the VMA is dispersed in water directly by using a high sheer mixer while adding the VMA to water, thus minimizing or avoiding clumping. Once the VMA and water is high-shear-mixed to provide a high viscosity first suspension, then the at least one alkali or alkaline earth metal salt can be combined, using conventional mixers at slower speeds, to obtain a second (aqueous) suspension. For example, VMA (0.01%–3.0% by total weight of final composition) is combined thoroughly with water (5%–30%) under high sheer to effect dispersion of the VMA. Once a viscous dispersion of the VMA is obtained, the rate of stirring is slowed to a level sufficient to achieve mixing. Subsequently, up to 50% by total weight of optional non-aqueous liquid components may be added (e.g., alkanolamine such as triethanolamine, triisopropanolamine, diethanol-isopropanolamine) may be added. Subsequently, one or more salts (50%–90% by wt) are added, with stirring, to achieve a homogeneous mixture.

Exemplary embodiments of the invention are illustrated by the following examples, which are not intended to limit the scope of the invention.

EXAMPLE 1

A viscosity modifying agent, such as biopolymer S-657, is mixed with a dispersant polycarboxylate superplasticizer (available from Grace Construction Products, Cambridge, Mass., under the tradename ADVA® 100) and water, and preferably with a biocide. This "premix" is then combined with an alkanolamine and other optional admixtures, such as corn syrup and molasses, to form a first suspension.

To this first suspension are added salts to obtain a second suspension: sodium gluconate and sodium chloride. Thus, a second liquid aqueous suspension is obtained wherein the salts are evenly dispersed in the thick liquid medium.

The components are relative amounts are summarized below in Table 1.

TABLE 1

| Components | By Weight | Percentage |
|---|---|---|
| "First Suspension" | | |
| Biopolymer S-657 | 44 grams | 0.20% |
| Superplasticizer | 205 grams | 0.93% |
| Water | 4150.6 grams | 18.8% |
| Biocide | 0.4 grams | 13.0% |
| Triethanolamine | 2860 grams | 20.0% |
| Premix | 4400 grams | |
| Corn Syrup (80%) | 2640 grams | 12.0% |
| Molasses (80%) | 2640 grams | 12.0% |
| "Second Suspension" | | |
| Sodium Gluconate | 5170 grams | 23.5% |
| Sodium Chloride | 4312 grams | 19.6% |

Stability Test

In order to test the shelf-stability, the liquid suspension obtained after incorporation of the salt components is placed into a tube that is six feet tall and four inches diameter and allowed to sit undisturbed for 10 days at 100° F. The material is partitioned into equal fourths, and total solids are measured to determine if there has been any settling of material within the tube-shaped volume. When one (1) gram of material taken from each of the quarter portions was removed and dried at 125° C. for one hour, the percentage of solids in the portion was determined. The data indicated that no appreciable drifting of the solids had occurred, and thus the conclusion is that the liquid suspension containing the salt(s) and other cement additives is shelf-stable.

The data is provided in Table 2 below:

TABLE 2

| Portion | % solids |
|---|---|
| Top ¼ | 76.80% |
| Second ¼ | 76.40% |
| Third ¼ | 75.90% |
| Bottom ¼ | 76.80% |

To make the laboratory grind, a blend of 95% cement clinker and 5% gypsum, comprising 3500 grams total, are combined with the cement additive at the specified dosage based on total cement weight. This mixture is ground in a laboratory ball mill until the desired fineness as measured by Blaine ($cm^2$/gram) is reached.

Laboratory mortar is then prepared with the ground cement according to ASTM C109. Cubes are prepared according to this standard, and then measured for compressive strength (in terms of MPascals) at 1, 2, 7, and 28 days.

TABLE 3

Laboratory cement grinds using ASTM Type 1 clinker
Both additives tested at 615 ppm active

| | 1 day MPa | 2 day MPa | 7 day MPa | 28 day MPa | Blaine Fineness $cm^2$/gr |
|---|---|---|---|---|---|
| Cement Additive of Example 1 | 14.4 | 19.1 | 31.5 | 44.2 | 3365 |
| 41% solids standard material | 13.8 | 19.7 | 32.0 | 46.6 | 3325 |
| % of standard | 104 | 97 | 98 | 95 | |

As shown in Table 3, the compressive strength for was essentially the equal at 1, 2, 7, and 28 days.

EXAMPLE 2

Another exemplary cement additive composition of the invention was made as follows. Polysaccharide S-657, a polycarboxylate superplasticizer, and water were combined to form a first aqueous suspension, to which was then added triethanolamine. Then salt (sodium chloride) was added to obtain a second aqueous suspension. By preparing this second suspension in sequence, the salt can be evenly dispersed in the thickened liquid medium. The compositional components are identified in Table 4 below:

TABLE 4

| | | % of total |
|---|---|---|
| PC (ADVA 100) | 136 Grams | 0.61% |
| VMA (S-657) | 29 Grams | 0.13% |
| Water | 2254.8 Grams | 10.3% |

TABLE 4-continued

|  |  | % of total |
| --- | --- | --- |
| Biocide | 0.2 Grams |  |
| Triethanolamine | 4840 Grams | 22.0% |
| Sodium Chloride | 14740 Grams | 67.0% |
| Total: | 22000 Grams |  |

The stability of the obtained liquid cement additive composition was tested by placing portions of the sample in a tube six feet tall and four inches wide, and allowing it to sit undisturbed for 10 days at 100 degrees F. Then the material is partitioned into equal fourths. Total solids within these fourth portions are measured to determine if there is settling of material. The resultant solids determined from portion to portion were deemed sufficiently similar to support the conclusion that there was no separation of solids within the suspension. The method for measuring the total solids involved taking one gram of material and drying it at a temperature of 125° C. for 1 hour. The data is presented in Table 5 below:

TABLE 5

| Portion | % solids |
| --- | --- |
| Top ¼ | 89.20% |
| Second ¼ | 88.80% |
| Third ¼ | 89.30% |
| Bottom ¼ | 89.30% |

EXAMPLE 3

A further exemplary cement additive composition of the invention was made as follows. Polysaccharide S-657, a polycarboxylate superplasticizer, water, were combined to form a first aqueous suspension, to which was then added triethanolamine. Then salt (sodium chloride) was added to this liquid dispersion. By preparing this suspension with this order of addition, the salts can be evenly dispersed in the thickened liquid medium. The compositional components are identified in Table 6 below:

TABLE 6

|  |  | % total |
| --- | --- | --- |
| PC | 164.5 grams | 0.66% |
| S-657 | 35 grams | 0.14% |
| Water | 2300.3 grams | 9.2% |
| Biocide | 0.2 grams |  |
| Triethanolamine | 7500 grams | 30.0% |
| Sodium Chloride | 15000 grams | 60.0% |
| Total | 25000 grams |  |

The above liquid cement additive composition was tested for stability by placing it into a tube 6' tall and 4" wide, and allowed to sit undisturbed for 10 days at 100° F. Then the material is partitioned into equal fourths. Total solids are measured to determine if there has been any settling of material. For this material, values were close enough to determine that there was separation of solids within the suspension. The method for measuring total solids: 1.0 gram of material is dried at 125° C. for 1 hour. The measurements are provided in Table 7 below:

TABLE 7

| Portion | % solids |
| --- | --- |
| Top 1" | 90.70% |
| Top ¼ | 90.20% |
| Second ¼ | 90.20% |
| Third ¼ | 90.40% |
| Bottom ¼ | 90.20% |

This composition was transferred into a 5 gallon bucket for long term storage at room temperature, and a one quart container for storage at 100° F., and has remained stable for several months in both conditions.

EXAMPLE 4

Comparative

A composition similar to the one described above in Examples 2 and 3 were made, except this time the salt was added to the triethanolamine, S-657, and PC superplasticizer, and then water at the end to form the aqueous suspension. Thus, the two successive stages previously described were avoided. The composition separated into two phases within ten minutes. Hence, the importance of forming the first aqueous suspension having the VMA, PC superplasticizer, and water, prior to addition of additional cement additives and the one or more salts, was deemed critical.

EXAMPLE 5

Another high-solids liquid cement additive composition was formulated, using triethanolamine as a dispersing agent for the biopolymer S-657. 22 parts of TEA were combined with 0.13 parts of S-657. 10 parts water were added to this mixture, and an increase in apparent viscosity was observed as the S-657 was stirred with the water. 67 parts sodium chloride were added to the suspension, and viscosity was increased. This suspension remained stable for at least a one-month period following mixing.

EXAMPLE 6

Another high-solids liquid cement additive composition was formulated as follows, this time using a salt as a dispersing agent for biopolymer S-657. In a first container, 10 parts water were combined with 22 parts triethanolamine (TEA). In a second container, 0.13 parts S-657 were combined with 67 parts salt. The contents of the two containers were combined and mixed together. The mixture was more difficult to combine and work together than was the case in Example 5, but the resultant liquid cement additive composition remained stable for at least a one month period following mixing.

EXAMPLE 7

Another high-solids liquid cement additive composition was formulated, this time with the use of water, as follows. 0.15 parts polyethylene glycol having 100,000 MW was combined and mixed with 10 parts polyethylene glycol having 200 MW. To this mixture was added 22 parts triethanolamine, and mixed together. Following this step, 67 parts salt were incorporated and mixed together. This trial established that it was possible to formulate a non-aqueous dispersion, but the viscosity was rather difficult in comparison with the prior two examples.

The foregoing examples and embodiments are provided for purposes of illustration only and not intended to limit the scope of the invention.

It is claimed:

1. A liquid cement additive composition, comprising:
a liquid carrier for suspending solid particles therein;
a first cement additive comprising solid particles dispersed substantially throughout said liquid carrier, said solid particles comprising at least one alkali or alkaline earth metal salt selected from the group consisting of chlorides, nitrates, nitrites, thiocyanates, borates, polyphosphonates, and gluconates;
a second cement additive different from said first cement additive, said second cement additive contained within or as said liquid carrier, said second cement additive comprising an amine, an alkanolamine, a poly (hydroxyalkylated) polyethyleneamine, a glycol, a carbohydrate, a surfactant, or mixture thereof;
said liquid cement additive composition having a total salt content in an amount that is not less than 50% based on total weight of said liquid cement additive composition and in an amount that is not greater than 90% based on the total weight of said liquid cement additive composition; and
said liquid cement additive composition having a total solids content no less than 70% and no greater than 100% based on total dry weight solids.

2. The composition of claim 1 wherein said liquid carrier is water.

3. The composition of claim 2 wherein a first portion of said at least one alkali or alkaline earth metal salt is solubilized in said liquid carrier while a second portion of said at least one alkali or alkaline earth metal salt is contained in the form of non-dissolved solid particles dispersed within said liquid carrier.

4. The composition of claim 1 further comprising at least one viscosity modifying agent operative to enhance the ability of said liquid carrier to suspend said at least one alkali or alkaline earth metal salt.

5. The composition of claim 4 wherein said viscosity modifying agent is selected from the group consisting of (a) biopolymer polysaccharides selected from the group consisting of S-657, welan gum, xanthan, rhamsan, gellan, dextran, pullulan, curdlan, and derivatives thereof; (b) marine gums selected from the group consisting of algin, agar, carrageenan, and derivatives thereof; (c) plant exudates selected from the group consisting of locust bean, gum arabic, gum Karaya, tragacanth, Ghatti, and derivatives thereof; (d) seed gums selected from the group consisting of guar, locust bean, okra, psyllium, mesquite, and derivatives thereof; and (e) starch-based gums selected from the group consisting of ethers, esters, and derivatives thereof (f) associative thickeners selected from the group consisting of hydrophobically modified alkali swellable acrylic copolymer, hydrophobically modified urethane copolymer, associative thickeners based on polyurethanes, cellulose, polyacrylates, or polyethers.

6. The composition of claim 4 wherein said viscosity modifying agent comprises biopolymer S-657.

7. The composition of claim 6 further comprising a polycarboxylate superplasticizer.

8. The composition of claim 4 further comprising a dispersant for said viscosity modifying agent, said dispersant being selected from the group consisting of ethanol, methanol, isopropanol, polyethylene glycol having an average molecular weight not less than 20,000 and not greater than 600,000, a polycarboxylate superplasticizer, an amine, a glycol, or mixture thereof.

9. The composition of claim 1 wherein said liquid carrier is nonaqueous.

10. The composition of claim 9 wherein said nonaqueous liquid carrier is selected from the group consisting of an amine, an alkanolamine, a poly(hydroxyalkylated) polyethyleneamine, a glycol, a carbohydrate, a surfactant, or mixture thereof.

11. The composition of claim 1 having shear thinning characteristic expressed in terms of viscosity ratio (Brookfield viscometer, Spindle #3, 25 degrees C.), wherein viscosity measured at 3 rpm, divided by viscosity measured at 30 rpm, is no less than 2 and no greater than 40.

12. Method for making a liquid cement additive composition, comprising: providing a viscosity modifying agent and a liquid carrier for suspending said viscosity modifying agent, said liquid carrier comprising an amine, an alkanolamine, a poly(hydroxyalkylated) polyethyleneamine, a glycol, a carbohydrate, a surfactant, or mixture thereof; and introducing into said liquid carrier medium a plurality of solid particles comprising at least one alkali or alkaline earth metal salt selected from the group consisting of chlorides, nitrates, nitrites, thiocyanates, borates, polyphosphonates, and gluconates.

13. The method of claim 12 wherein said liquid carrier further comprises water.

14. The method of claim 12 wherein said liquid carrier comprises an amine, an alkanolamine, or mixture thereof.

15. The method of claim 10 wherein said liquid carrier comprises a glycol having an average molecular weight no less than 20,000 and no greater than 600,000; and said salt is a chloride salt.

16. A method for making a cement additive composition, comprising:
obtaining a first liquid aqueous suspension by combining a viscosity modifying agent, a dispersing agent operative to disperse the viscosity modifying agent in water, and water; and
obtaining a second liquid suspension by combining said obtained first liquid aqueous suspension with at least one alkali or alkaline earth metal salt, whereby water is present in said second liquid aqueous suspension in an amount not less than 4% by total weight of said composition and not greater than 30% by total weight of said composition.

17. The method of claim 16 wherein said viscosity modifying agent is combined first with said dispersing agent, and water is subsequently added to obtain said first liquid aqueous suspension.

18. The method of claim 17 wherein said viscosity modifying agent is selected from the group consisting of (a) biopolymer polysaccharides selected from the group consisting of S-657, welan gum, xanthan, rhamsan, gellan, dextran, pullulan, curdlan, and derivatives thereof; (b) marine gums selected from the group consisting of algin, agar, carrageenan, and derivatives thereof; (c) plant exudates selected from the group consisting of locust bean, gum arabic, gum Karaya, tragacanth, Ghatti, and derivatives thereof; (d) seed gums selected from the group consisting of guar, locust bean, okra, psyllium, mesquite, and derivatives thereof; and (e) starch-based gums selected from the group consisting of ethers, esters, and derivatives thereof f) associative thickeners selected from the group consisting of hydrophobically modified alkali swellable acrylic copolymer, hydrophobically modified urethane copolymer, associative thickeners based on polyurethanes, cellulose, polyacrylates, or polyethers.

19. The method of claim 18 wherein said viscosity modifying agent is S-657.

20. The method in claim 12 wherein said liquid carrier further comprises a dispersant operative to disperse said viscosity modifying agent within said liquid carrier, said dispersant being selected from the group consisting of ethanol, methanol, isopropanol, a polyethylene glycol having a molecular weight not less than 300 and not greater than 6000, and a polycarboxylate superplasticizer.

21. The method of claim 20 wherein said dispersant is a polycarboxylate comb polymer having pendant oxyalkylene groups.

22. The method of claim 16 further comprising combining said first aqueous suspension with a cement additive selected from the group consisting of an amine, an alkanolamine, a glycol, a carbohydrate, and a surface active agent.

23. The method of claim 16 wherein said viscosity modifying agent is shear-thinning.

24. The method of claim 16 wherein said viscosity modifying agent (VMA) is combined with a dispersant operative to disperse said VMA, said VMA and dispersant being present together in a VMA:dispersant ratio of 1:1 to 1:10.

25. The method of claim 16 wherein said at least one alkali or alkaline earth metal salt is a dry powder combined with said first aqueous suspension.

26. The method of claim 16 further comprising incorporating into said first aqueous suspension, prior to combining said first aqueous suspension with said at least one alkali or alkaline earth metal salt, an additional cement additive component selected from the group consisting of an amine and carbohydrate.

27. The composition provided by the method of claim 16.

28. The liquid cement additive composition of claim 1 wherein said viscosity modifying agent is polysaccharide S-657 in an amount no less than 0.01% and no greater than 3.0% based on total weight of said liquid cement additive composition; said liquid cement additive composition further comprises water in an amount no less than 5% and no greater than 50% based on total weight of said liquid cement additive composition; said liquid cement additive composition further comprising a dispersant operative to disperse said viscosity modifying agent, said polycarboxylate comb polymer having pendant oxyalkylene groups and being present in an amount no less than 0.02% and no greater than 4.0% based on total weight of said liquid cement additive composition; and said at least one alkali or alkaline earth metal salt being in an amount no less than 40% and no greater than 96%, said salt being present as solid particles suspended within said liquid carrier.

29. A method for grinding cement comprising addition of the composition of claim 1 to cement clinker or gypsum during the grinding thereof to obtain cement.

30. A method for grinding cement comprising addition of the composition of claim 1 to cement clinker or gypsum during the grinding thereof to obtain cement.

31. A method for making a high solids salt cement additive composition, comprising: mixing a viscosity modifying agent and water using a high shear mixer to form a first suspension; and subsequently combining said first suspension with at least one alkali or alkaline earth metal salt.

* * * * *